Feb. 20, 1923.

A. MOYEN.
HOSE COUPLING.
FILED AUG. 12, 1921.

1,446,057.

INVENTOR
ALPHONSE. MOYEN.

Patented Feb. 20, 1923.

1,446,057

UNITED STATES PATENT OFFICE.

ALPHONSE MOYEN, OF EDMONTON, ALBERTA, CANADA.

HOSE COUPLING.

Application filed August 12, 1921. Serial No. 491,728.

*To all whom it may concern:*

Be it known that I, ALPHONSE MOYEN, a subject of the King of Great Britain, and resident of the city of Edmonton, in the Province of Alberta, and Dominion of Canada, have invented certain new and useful Improvements in Hose Couplings, of which the following is a specification.

This invention relates to improvements in hose couplings, and particularly to the washer or gaskets therefor, and the objects of the invention are to prevent loss or displacement of the washers when the hose is uncoupled and the parts of the coupling separated.

In the ordinary hose coupling the washer is retained in the same by friction or placed in a groove therein and is readily displaced or lost, and, when lost, considerable water is wasted through leakage.

According to the present invention, the washer or gasket is formed with an extension extending in a slot formed in a projection on one member of the hose coupling, the washer being retained by a locking key which extends through the projection, all as hereinafter more fully set forth and described in the accompanying specification and drawings.

In the drawings.

In the drawings, like characters of reference indicate corresponding parts in all the figures.

Figure 1:
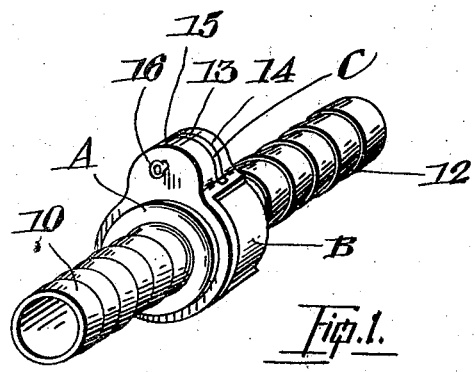
Figure 1 is a perspective view of the hose coupling.
Figure 2:
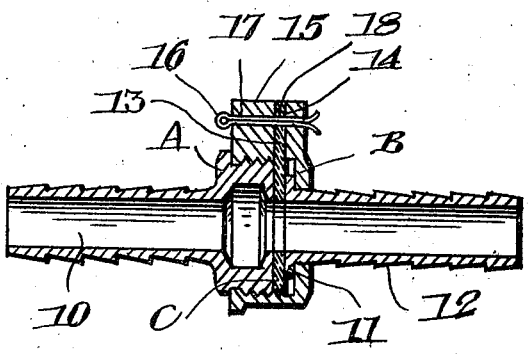
Figure 2 is a longitudinal sectional view.
Figure 3:
Figure 3 is a sectional view of the female coupling.
Figure 4:
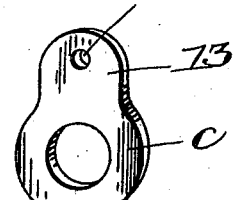
Figure 4 is a perspective view of the washer or gasket.

Referring to the drawings:

A indicates the male member and B, the female member of the coupling, the male member being connected to a tubular connecting neck 10 while the female member is formed with a central opening which extends around and engages the flange 11 on the connecting neck 12. It may be stated that the invention may be applied to a variety of the usual form of hose coupling.

In accordance with the present invention, the connecting washer C, usually located in the base of the channel member, is formed with an extension 13 which extends in a slot 14 formed in a projection 15 on the female member B, the washer being retained in position by means of a locking key 16 shown in the form of a split key which extends through a suitable perforation 17 in the projection and a perforation 18 in the washer. The male member has the usual screw-threaded connection with the female member.

It will be seen by the present invention the washer is firmly locked in position, and it will be impossible for it to become unloosened or displaced. The washer may be made of rubber, leather, or any suitable and tough material.

As many changes could be made in the above construction and many apparently widely different embodiments of my invention within the scope of the claims, constructed without departing from the spirit or scope thereof, it is intended that all matter contained in the accompanying specification and drawings shall be interpreted as illustrative and not in a limiting sense.

Figure 5:
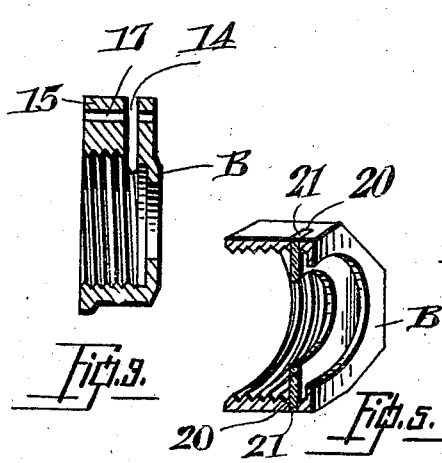
Figure 5 is a sectional perspective view of an alternative form of the invention.

In the alternative form of the invention shown in Figure 5, slots 20 are formed in opposite sides of the female member through which projecting lugs 21 on the washer extend.

What I claim as my invention is:

1. In a coupler, a coupling member having a recess, a washer having an extension extending in the recess, a locking key extending through the coupling member and engaging the extension in the washer.

2. The coupler as claimed in claim 1, in which the key is in the form of a split pin which extends through a projection formed on the female coupling member.

In witness whereof I have hereunto set my hand in the presence of two witnesses.

ALPHONSE MOYEN.

Witnesses:
MARGARET THOMPSON,
JOHN EDWIN KINOTT.